(12) United States Patent
Janitch (10) Patent No.: US 10,760,941 B2
(45) Date of Patent: Sep. 1, 2020

(54) STEAM PROBE WITH CONDENSATION RETURN

(71) Applicant: Magnetrol International, Incorporated, Aurora, IL (US)

(72) Inventor: Paul G. Janitch, Lisle, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 347 days.

(21) Appl. No.: 15/896,660

(22) Filed: Feb. 14, 2018

(65) Prior Publication Data

US 2018/0306631 A1 Oct. 25, 2018

Related U.S. Application Data

(60) Provisional application No. 62/488,316, filed on Apr. 21, 2017.

(51) Int. Cl.

| | | |
|---|---|---|
| *G01F 23/284* | (2006.01) | |
| *G01S 7/282* | (2006.01) | |
| *G01S 13/88* | (2006.01) | |
| *G01S 7/02* | (2006.01) | |
| *G01S 13/02* | (2006.01) | |
| *G01S 13/10* | (2006.01) | |

(52) U.S. Cl.
CPC ............ *G01F 23/284* (2013.01); *G01S 7/282* (2013.01); *G01S 13/88* (2013.01); *G01S 13/0209* (2013.01); *G01S 13/10* (2013.01); *G01S 2007/027* (2013.01)

(58) Field of Classification Search
CPC ......... G01F 23/284; G01S 7/282; G01S 13/88
See application file for complete search history.

(56) References Cited

U.S. PATENT DOCUMENTS

| | | |
|---|---|---|
| 6,247,362 B1 | 6/2001 | Soroka |
| 2005/0024259 A1 | 2/2005 | Berry et al. |
| 2006/0225499 A1 | 10/2006 | Gravel et al. |
| 2007/0084281 A1 | 4/2007 | Fredriksson |

(Continued)

*Primary Examiner* — Marc Anthony Armand
(74) *Attorney, Agent, or Firm* — Wood, Phillips, Katz, Clark & Mortimer (57) ABSTRACT

There is disclosed herein a probe comprising a process connection for mounting to a process vessel. A sealed connector is for connection to the measurement instrument and includes an extension sleeve. A return tube extends from the extension sleeve and is secured to the process connection, the return tube has a connector end proximate the sealed connector and a distal end including vent openings below the process connection. A process tube is connected to the distal end of the return tube and extends into the process vessel. A center conductor is coaxial with the return tube and the process tube for conducting the pulses. A target tube is coaxial with and received within the return tube to define a condensation return path therebetween. The target tube extends downward from a near end at the return tube connector end by bottom end to a position below the process connection. The target tube includes apertures at the near end opening into the condensation return path. Steam from the process vessel flows from inside the target tube through the target tube apertures and into the condensation return path whereby the steam condenses and exits via the vent openings into the process vessel.

14 Claims, 5 Drawing Sheets

(56) References Cited

U.S. PATENT DOCUMENTS

2009/0302867 A1 12/2009 Schroth
2014/0109699 A1* 4/2014 Janitch .................. G01D 11/30
                     73/866.5

* cited by examiner

STEAM PROBE WITH CONDENSATION RETURN

CROSS-REFERENCE TO RELATED APPLICATIONS

This application claims priority of provisional application No. 62/488,316, filed Apr. 21, 2017.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a guided wave radar probe with a condensation return path.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and low cost time domain reflectometry (TDR) instruments.

In a TDR instrument, a very fast pulse with a rise time of 500 picoseconds, or less, is propagated down a probe that serves as a transmission line in a vessel. The pulse is reflected by a discontinuity caused by a transition between two media. For level measurement, that transition is typically where the air and the material to be measured meet. These instruments are also known as guided wave radar (GWR) measurement instruments.

One type of probe used by GWR level instruments is a coaxial probe. The coaxial probe consists of an outer tube and an inner conductor. When a coaxial probe is immersed in the liquid to be measured, there is a section of constant impedance, generally air, above the liquid surface. An impedance discontinuity is created at the level surface due to the change in dielectric constant of the liquid versus air at this point. When the GWR signal encounters any impedance discontinuity in the transmission line, part of the signal is reflected back toward the source in accordance with theory based on Maxwell's laws. The GWR instrument measures the time of flight of the electrical signal to, and back from, this reflecting point, being the liquid surface, to find the liquid level.

Figure 1:
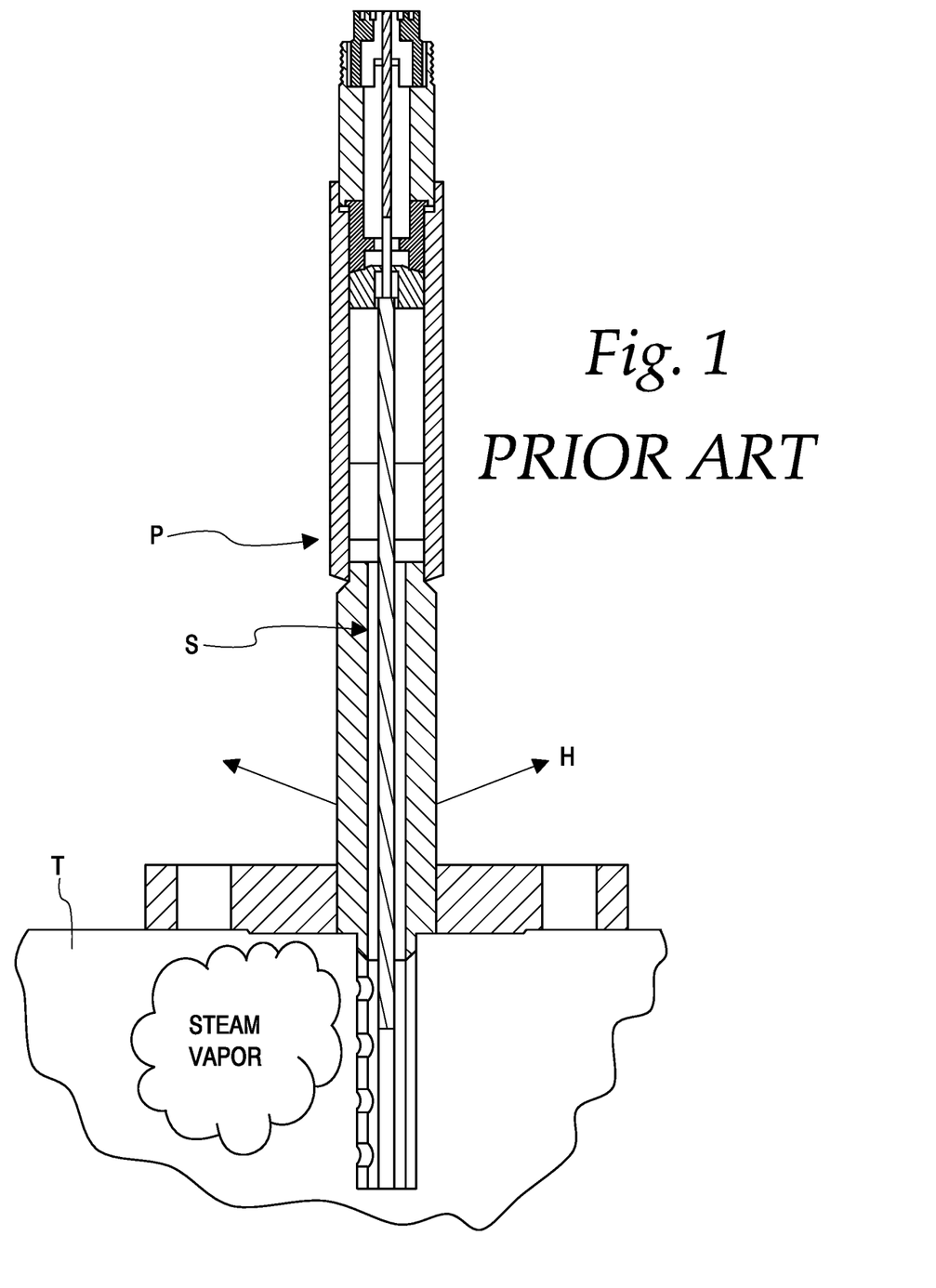
FIG. 1 is a sectional view of a prior art guided wave radar probe.

With any steam vessel, thermal energy is lost to the surroundings due to thermal conduction through the tank walls and convection around the exterior of the tank. If enough heat is lost, then the saturated vapor in the vessel will condense on the interior walls. Condensation can also occur in the GWR probe P located on top of a tank T as shown in FIG. 1. Particularly, there is a space S between the center conductor and the outer sleeve. Heat lost is represented by the arrows H. Because of the heat lost, the space S may be partially filled with condensation. Because the dielectric constant of water condensation is much greater than the vapor, the presence of condensation in the space S of the probe P may cause a significant delay of the signal transmission and result in a level measurement error.

The present invention is directed to solving one or more of the problems discussed above in a novel and simple manner.

SUMMARY

As described herein, a probe uses a condensation return path for condensation to return to a vessel.

In accordance with one aspect, a probe defines a transmission line for use with a measurement instrument including a pulse circuit connected to the probe for generating pulses on the transmission line and receiving reflected pulses on the transmission line. The probe comprises a process connection for mounting to a process vessel. A top extension extends above the process connection and comprises a sealed connector. An outer tube extends from the top extension and is secured to the process connection, the outer tube having a connector end proximate the sealed connector and a distal end to extend into a process liquid. A center conductor is coaxial with the outer tube for conducting the pulses. A target tube is coaxial with and received within the outer tube to define a space therebetween. The target tube extends downward from a near end at the outer tube connector end to a bottom end below the process connection. The target tube includes apertures at the near end opening into the space and the outer tube includes vent openings below the process connection. Steam from the process vessel flows from inside the target tube through the target tube apertures and into the space whereby the steam condenses and exits via the vent openings into the process vessel.

It is a feature that the outer tube comprises a return tube of the top extension and a process tube extending into the process vessel. The vent openings are at a distal end of the return tube and the process tube is connected to the return tube below the vent openings. The return tube may be connected to the process tube using a weld coupling and the weld coupling surrounds the target tube in the space to prevent condensate from returning to an inside of the process tube.

It is another feature that the target tube near end comprises a plurality of radially spaced upwardly extending tabs engaging the sealed connector and wherein voids between the tabs define the apertures.

It is another feature that the target tube has a length less than the outer tube to define a reference impedance change.

It is a further feature that the target tube is adapted to provide impedance match with the sealed connector.

There is disclosed in accordance with another aspect a probe comprising a process connection for mounting to a process vessel. A sealed connector is for connection to the measurement instrument and includes an extension sleeve. A return tube extends from the extension sleeve and is secured to the process connection, the return tube has a connector end proximate the sealed connector and a distal end including vent openings below the process connection. A process tube is connected to the distal end of the return tube and extends into the process vessel. A center conductor is coaxial with the return tube and the process tube for conducting the pulses. A target tube is coaxial with and received within the return tube to define a condensation return path therebetween. The target tube extends downward from a near end at the return tube connector end to a bottom end below the process connection. The target tube includes apertures at the near end opening into the condensation return path. Steam from the process vessel flows from inside the target tube through the target tube apertures and into the condensation return path whereby the steam condenses and exits via the vent openings into the process vessel.

It is another feature that the extension sleeve comprises a center pin connected to the center conductor and dielectric inserts surrounding the center pin.

Other features and advantages will be apparent from a review of the entire specification, including the appended claims and drawings.

DETAILED DESCRIPTION

Figure 2:
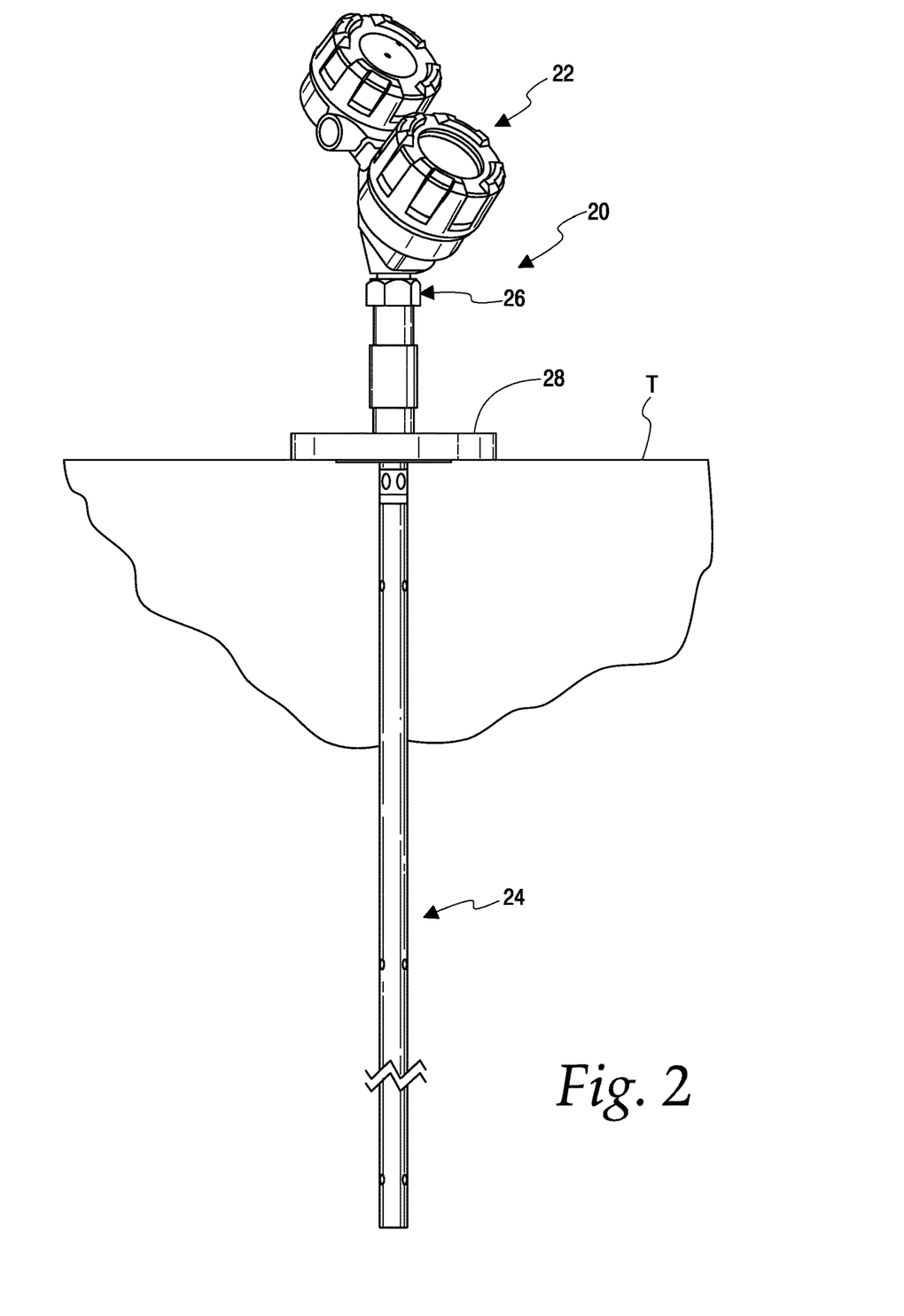
FIG. 2 is an elevation view of a guided wave radar instrument including a probe with a condensation return path.

Referring to FIG. 2, a process instrument 20 is illustrated. As described below, the process instrument 20 includes a probe 24 that uses a condensation return path for condensation to return to a vessel T.

The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, the probe 24, and a connector 26 for connecting the probe 24 to the housing 22. The probe 24 is mounted to the process vessel T using a process connection, such as a flange 28. Alternatively, a process adaptor could be used. The housing 22 is then secured to the probe 24 as by threading the connector 26 to the probe 24. The probe 24 comprises a high frequency transmission line which, when placed in a fluid, can be used to measure level of the fluid. Particularly, the probe 24 is controlled by a controller in the housing 22 for determining level in the vessel.

As is known, the controller generates and transmits pulses on the probe 24. A reflected signal is developed off any impedance changes, such as the liquid surface of the material being measured. A small amount of energy may continue down the probe 24.

Guided wave radar combines TDR, ETS and low power circuitry. TDR uses pulses of electromagnetic (EM) energy to measure distance or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second.

Figure 3:
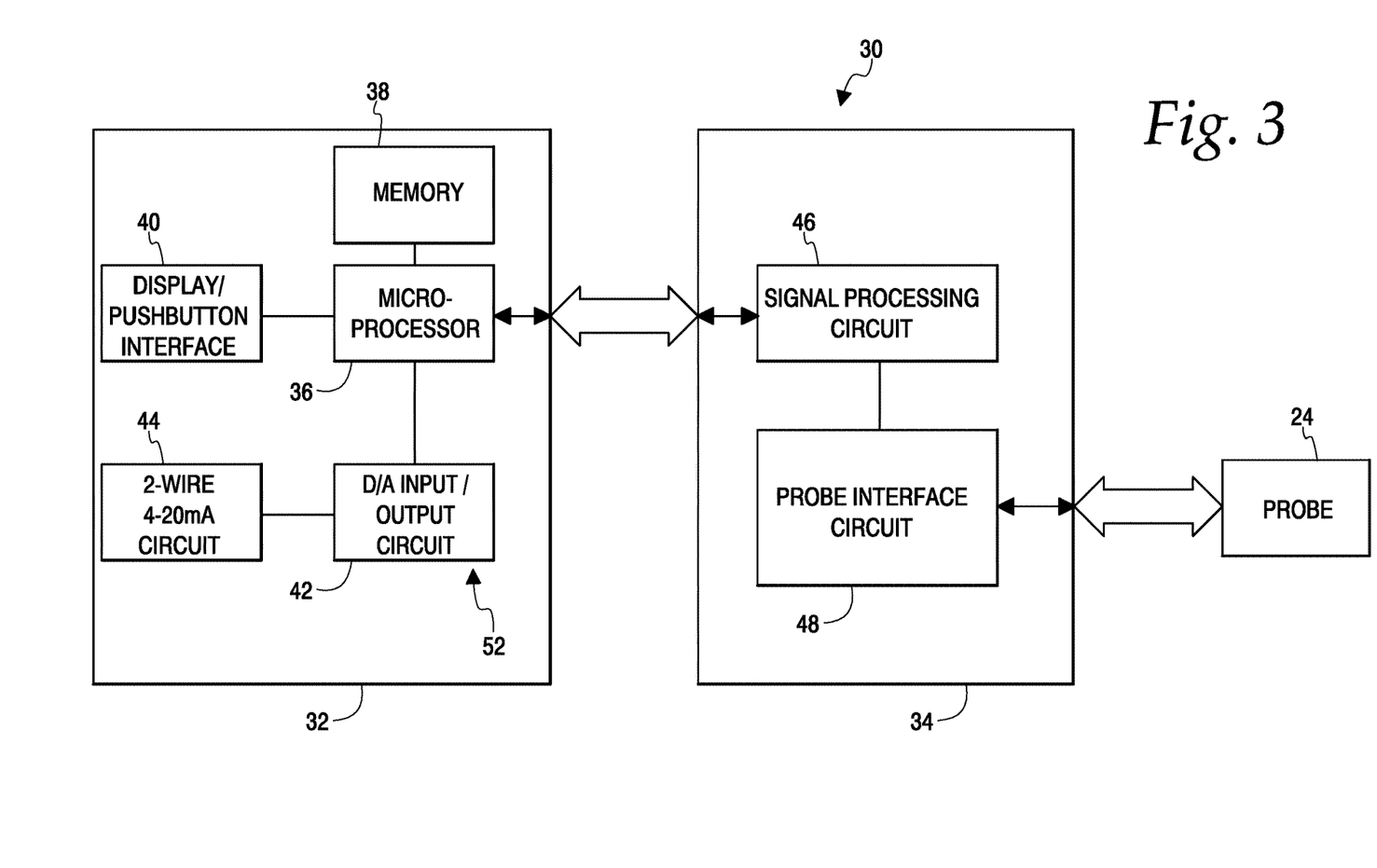
FIG. 3 is a block diagram of the transmitter of FIG. 2.

Referring to FIG. 3, electronic circuitry mounted in the housing 22 of FIG. 1 is illustrated in block diagram form as an exemplary controller 30 connected to the probe 24. As will be apparent, the probe 24 could be used with other controller designs. The exemplary controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, reference target, level, and end of probe. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 4:
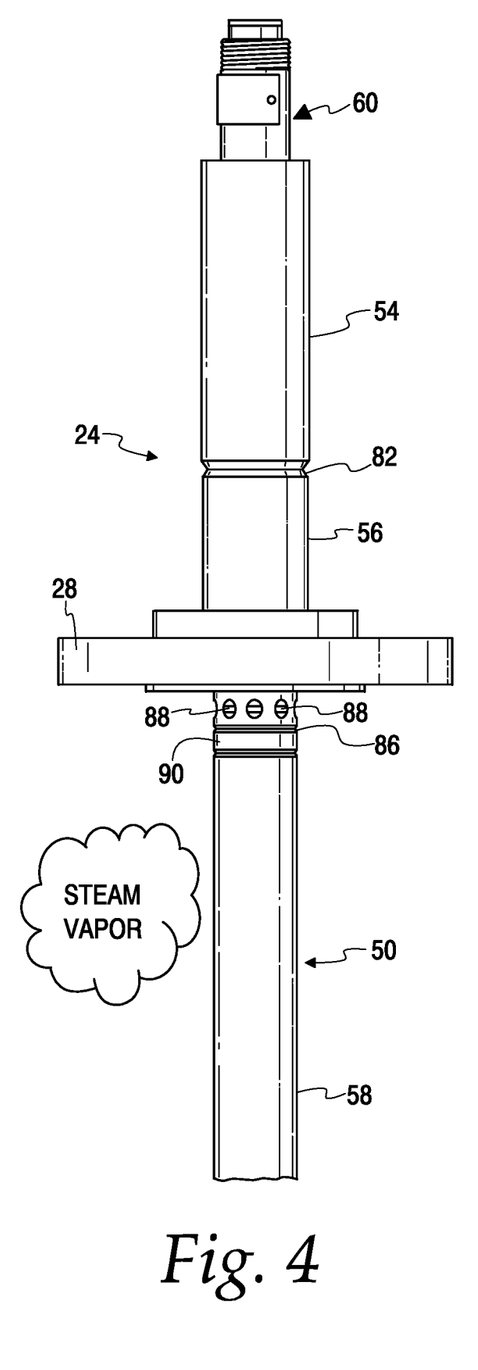
FIG. 4 is a side elevation view of the guided wave radar probe with the condensation return path.
Figure 5:
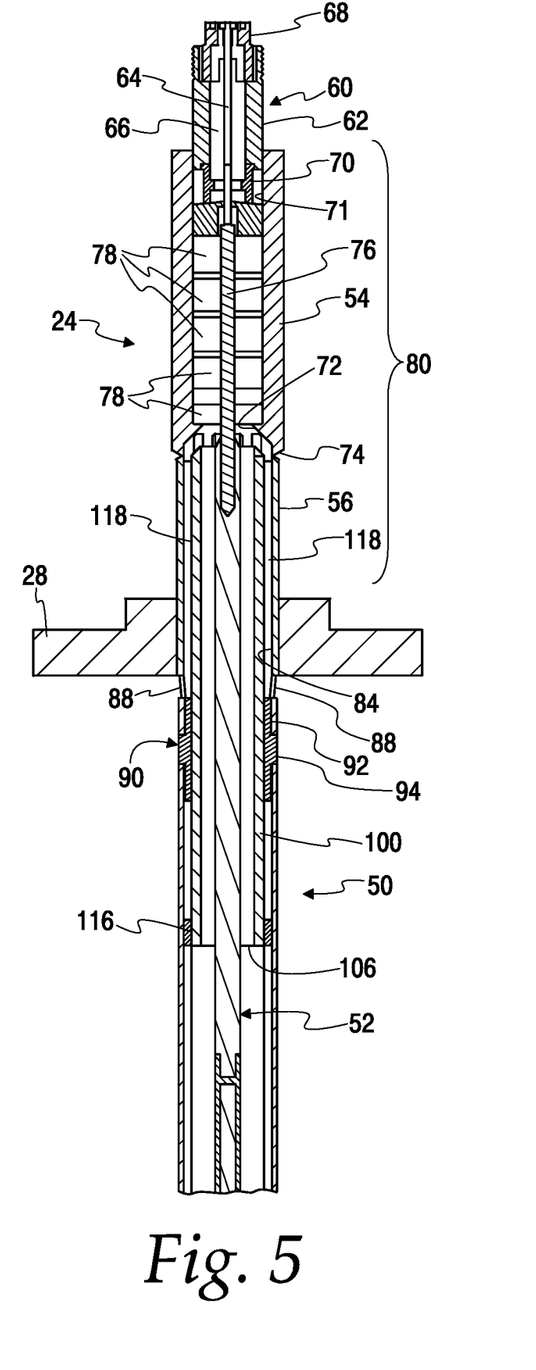
FIG. 5 is a sectional view of the probe of FIG. 4.

Referring to FIGS. 4 and 5, the probe 24 includes a conductive outer tube 50 and a center conductor 52 coaxial with the outer tube 50 for conducting the pulses.

The conductive outer tube 50 is of multi-part construction and includes an extension sleeve 54, a condensation return tube 56 and a process tube 58. A connector 60 provides a coaxial electrical connection between the probe 24 and the probe interface circuit 48, see FIG. 3. The connector 60 includes a stainless-steel housing 62 having a coaxial pin 64. A PTFE dielectric insert 66 is provided between the pin 64 and the housing 62. A coaxial terminal 68 provides for the electrical connection and acts as a fiducial, as is known. A glass-ceramic seal 70 at a lower end of the connector 60 provides a high temperature seal of the process vessel.

The extension sleeve 54 comprises a through opening 71 having a frustoconical counterbore 72 at a distal end 74. A center pin 76 in the extension sleeve 54 provides an electrical connection between the connector pin 64 and the center conductor 52. A plurality of annular ceramic dielectric inserts 78 surround the center pin 76 within the extension sleeve 54. The ceramic dielectric inserts 78 protect the glass-ceramic seal 70 from a direct exposure to steam. The characteristic impedance of the PTFE dielectric insert 66, the glass-ceramic seal 70, the ceramic dielectric inserts 78 and the outer tube 50 all match. Matching is important to minimize false reflections through the probe top. The collective probe top section above the flange 28 is sometimes referred to as a top extension 80.

This application is particularly directed to the use of a condensation return path in the probe 24, described below. The particular form of the combination of the connector 60 and extension sleeve 56 and related dielectric components is by way of example only and in fact may be incorporated in a single unit. As such, the term sealed connector is used herein to refer to any electrical connector including a seal and is not limited to the illustrated embodiment.

The return tube 56 has a connector end 82 secured to the extension sleeve 54, and thus is proximate the sealed connector, such as by a weld connection. The return tube 56 extends through an opening 84 in the flange 28 and may be welded or threaded thereto. The return tube 56 has a distal end 86 just below the flange 28. A plurality of vent openings 88 are provided in the return tube 56 between the return tube distal end 86 and the flange 28. A weld coupling 90 connects the return tube distal end 86 to the process tube 58. Particularly, the weld coupling 90 comprises a tubular element 92, see FIG. 5, having a central annular raised portion 94. Opposite ends of the tubular portion 92 are telescopically received in the return tube distal end 86 and the process tube 58 which abut the raised portion 94 and are welded thereto.

Figure 6:
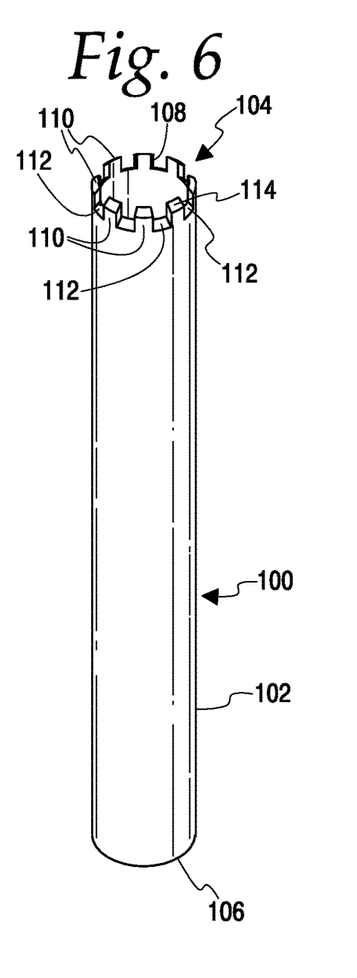
FIG. 6 is a perspective view of a target tube of the guided wave radar probe of FIG. 4.

Referring to FIG. 6, a target tube 100 comprises an elongate cylindrical wall 102 having a near end 104 and a distal end 106. The outer diameter of the cylindrical wall 102 is less than an inner diameter of the outer tube 50. The near end 104 includes a castle end 108. The castle end 108 includes a plurality of radially spaced tabs 110 defining openings 112 therebetween. The tops of the tabs 110 are angled as at 114 corresponding to angle of the frustoconical counterbore 72 of the extension sleeve 54.

The target tube 100 is coaxially received in the outer tube 50 with the castle end 108 abutting the frustoconical counterbore 72, see FIG. 5. The weld coupling tubular element 92 surrounds the target tube 100. A ring 116 is welded to the target tube distal end 106. The ring 116 keeps the outer tube 50 and the target tube 100 concentric and completes the electrical path between the target tube 100 and the outer tube 50.

The target tube distal end 106 is spaced five inches or more from the base of the flange 28. This causes an impedance change at the target tube distal end 106 which is a fixed reference target position used to compensate for changes in the signal propagation speed due to changes in the vapor dielectric constant over temperature. This is known as a reference target pulse described in U.S. Pat. No. 9,069,056, the specification of which is incorporated by reference herein. The five inch spacing is by way of example only and is to provide sufficient separation between the target and ceramic parts of the top extension 80 so that there is no interaction between them.

Figure 7:
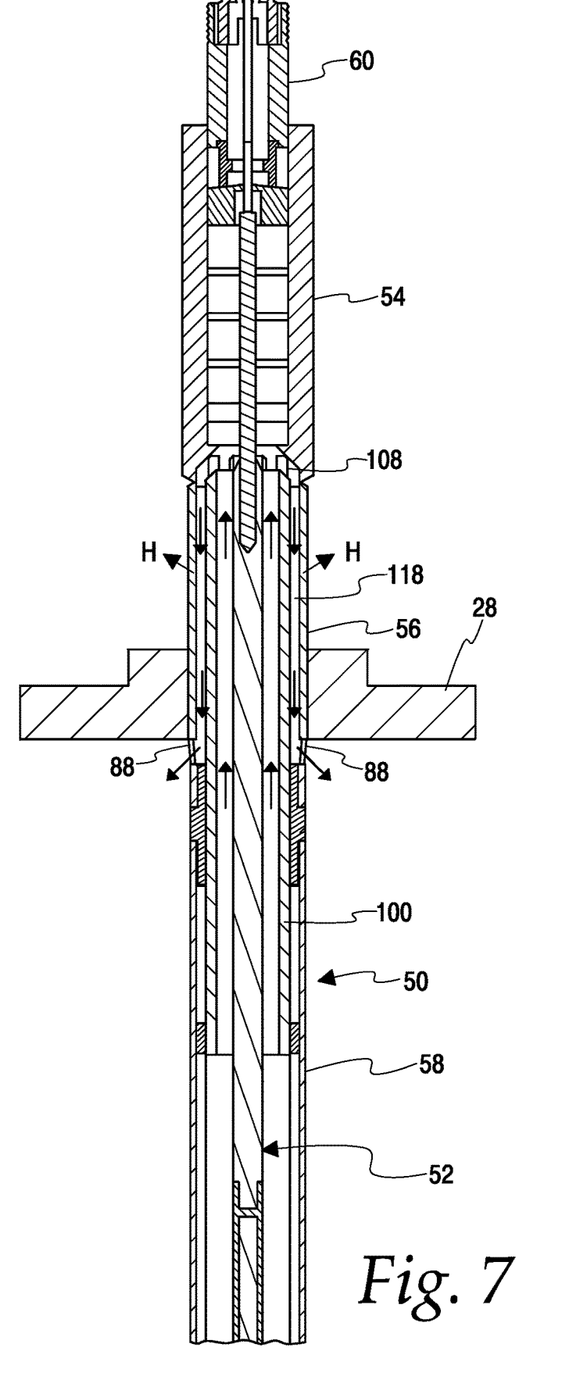
FIG. 7 is a sectional view, similar to FIG. 4, illustrating the condensation return path flow.

The target tube 100 has a narrower outer diameter than an inner diameter of the return tube 56 and the process tube 58. This results in a space 118 therebetween to define a condensation return path. The target tube castle end 108 permits flow from the inside of the target tube 100 to the outside of the target tube 100 in the openings 112 between the tabs 110. Particularly, steam vapor from the vessel will move upwardly into the target tube 100 as shown by the upwardly directed arrows in FIG. 7 and up and around the castle end 108 downwardly through the condensation return path 118, as represented by the downward directed arrows to the vent openings 88. Steam in the return tube 56 loses heat, see arrows H, to the surroundings and it will be at a lower quality state compared to the steam inside the target tube 100. The denser, low quality steam will fall drawing more of the higher quality steam up the target tube 100. If there is condensation, then it will occur in the condensation return path 118, not in the coaxial transmission line inside the target tube 100.

The overall structural details of the probe 24 in the illustrated embodiment of the invention are by way of example only. The invention is particularly directed to the inclusion of the target tube which provides a condensation return path and a reference target. The probe 24 could use other types of seals and/or dielectric material, as will be apparent to one skilled in the art. Thus, the details regarding the seal and dielectric materials are by way of example only and are generically referred to herein as a connector or sealed connector with such references not intended to be limited to the described and illustrated embodiment.

Thus, as described, an improved guided wave radar probe, which is used for industrial process level measurement, employs a condensation return path.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A probe defining a transmission line for use with a measurement instrument including a pulse circuit connected to the probe for generating pulses on the transmission line and receiving reflected pulses on the transmission line, the probe comprising:
a process connection for mounting to a process vessel;
a top extension extending above the process connection and comprising a sealed connector;
an outer tube having a connector end and an opposite distal end, the connector end extending from the top extension proximate the sealed connector and the outer tube being secured to the process connection between the connector end and the distal end so that the outer tube distal end extends into a process liquid;
a center conductor coaxial with the outer tube for conducting the pulses; and
a target tube coaxial with and received within the outer tube to define a space therebetween, the target tube extending downward from a near end at the outer tube connecter end to a bottom end below the process connection, the target tube including apertures at the near end opening into the space and the outer tube including vent openings below the process connection, whereby steam from the process vessel flows from inside the target tube through the target tube apertures and into the space whereby the steam condenses and exits via the vent openings into the process vessel.

2. The probe of claim 1 wherein the outer tube comprises a return tube of the top extension and a process tube extending into the process vessel.

3. The probe of claim 2 wherein the vent openings are at a distal end of the return tube and the process tube is connected to the return tube below the vent openings.

4. The probe of claim 3 wherein the return tube is connected to the process tube using a weld coupling and the weld coupling surrounds the target tube in the space to prevent condensate from returning to an inside of the process tube.

5. The probe of claim 1 wherein the target tube near end comprises a plurality of radially spaced upwardly extending tabs engaging the sealed connector and wherein voids between the tabs define the apertures.

6. The probe of claim 1 wherein target tube has a length less than the outer tube to define a reference impedance change.

7. The probe of claim 1 wherein the target tube is adapted to provide an impedance match with the sealed connector.

8. A probe defining a transmission line for use with a measurement instrument including a pulse circuit connected to the probe for generating pulses on the transmission line and receiving reflected pulses on the transmission line, the probe comprising:
a process connection for mounting to a process vessel;
a sealed connector for connection to the measurement instrument and including an extension sleeve;
a return tube extending from the extension sleeve and secured to the process connection, the return tube having a connector end proximate the sealed connector and a distal end including vent openings below the process connection;
a process tube connected to the distal end of the return tube and extending into the process vessel
a center conductor coaxial with the return tube and the process tube for conducting the pulses; and
a target tube coaxial with and received within the return tube to define a condensation path therebetween, the target tube extending downward from a near end at the return tube connecter end to a bottom end below the process connection, the target tube including apertures at the near end opening into the condensation path, whereby steam from the process vessel flows from inside the target tube through the target tube apertures and into the condensation path whereby the steam condenses and exits via the vent openings into the process vessel.

9. The probe of claim 8 wherein the extension sleeve comprises a center pin connected to the center conductor and dielectric inserts surrounding the center pin.

10. The probe of claim 8 wherein the process tube is connected to the return tube below the vent openings.

11. The probe of claim 10 wherein the return tube is connected to the process tube using a weld coupling and the weld coupling surrounds the target tube in the space to prevent condensate from returning to an inside of the process tube.

12. The probe of claim 8 wherein the target tube near end comprises a plurality of radially spaced upwardly extending tabs engaging the sealed connector and wherein voids between the tabs define the apertures.

13. The probe of claim 8 wherein target tube has a length less than the process tube to define a reference impedance change.

14. The probe of claim 8 wherein the target tube is adapted to provide an impedance match with the sealed connector.

* * * * *